United States Patent
Williams

[19]

[11] Patent Number: 5,899,085

[45] Date of Patent: May 4, 1999

[54] INTEGRATED AIR CONDITIONING AND POWER UNIT

[75] Inventor: Kenneth R. Williams, Huntington Beach, Calif.

[73] Assignee: McDonnell Douglas Corporation, Huntington Beach, Calif.

[21] Appl. No.: 08/905,303

[22] Filed: Aug. 1, 1997

[51] Int. Cl.[6] .................................................. F25B 27/00
[52] U.S. Cl. ........................................ 62/236; 62/DIG. 5
[58] Field of Search ................................. 62/DIG. 5, 236, 62/239, 331; 60/39.07, 39.183

[56] References Cited

U.S. PATENT DOCUMENTS

| | | | |
|---|---|---|---|
| 2,777,301 | 1/1957 | Kuhn | 62/136 |
| 3,057,170 | 10/1962 | Brahm | 62/DIG. 5 |
| 4,091,613 | 5/1978 | Young | 60/39.07 |
| 4,494,372 | 1/1985 | Cronin | 60/39.07 |
| 4,523,517 | 6/1985 | Cronin | 98/1.5 |
| 4,684,081 | 8/1987 | Cronin | 244/58 |
| 4,706,908 | 11/1987 | Huffman et al. | 244/118.5 |
| 4,910,414 | 3/1990 | Krebs | 62/238.4 |

*Primary Examiner*—William E. Tapolcai
*Attorney, Agent, or Firm*—Harness Dickey & Pierce P.L.C.

[57] ABSTRACT

An integrated air conditioning and power unit is provided for use with an aircraft. The system includes an air turbine 42 having air passages connected to an engine 10 of the aircraft for receiving bleed air and/or ram air for driving the air turbine 42. A motor/generator 104 is drivingly connected to the air turbine 42. The motor/generator 104 is capable of drawing electricity from an aircraft primary power system for driving the motor or generating electricity which is delivered to the primary power system 108. An air compressor 54 is drivingly connected to the motor/generator 104 and is provided with an air passage which receives bleed air 32 and/or ram air 30 from the aircraft engine 10. A cooling system 71 is provided including a system compressor 81 drivingly connected to the motor/generator 104. A cooling system evaporator 70 and a condenser 92 are connected to the system compressor by fluid passages. The air compressor 54 includes an air outlet for providing pressurized air which is cooled by the cooling system.

14 Claims, 2 Drawing Sheets

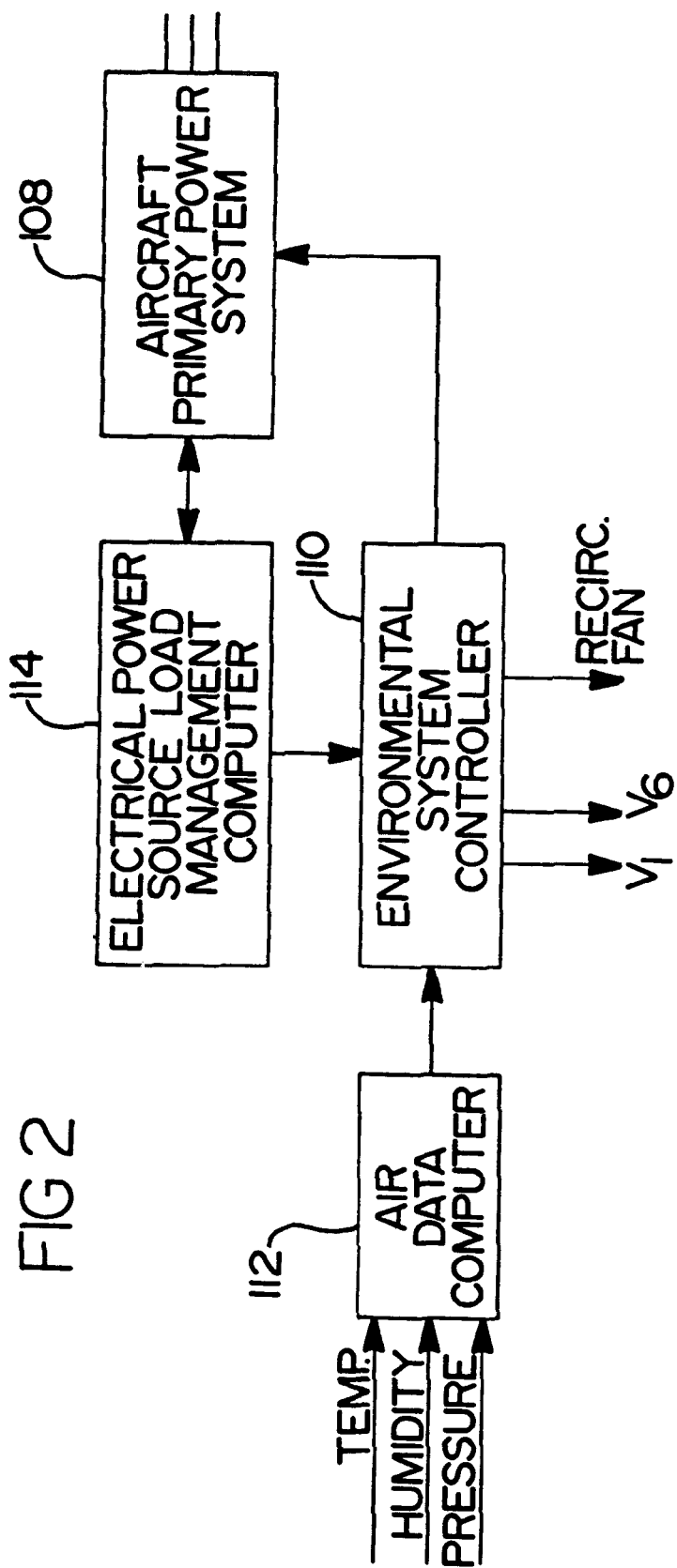

INTEGRATED AIR CONDITIONING AND POWER UNIT

BACKGROUND OF THE INVENTION

1. Technical Field

The present invention relates to secondary power systems for aircraft and, in particular, to an integrated air conditioning and power unit for an aircraft.

2. Background Art

In modern high-speed aircraft, weight reduction, space reduction, and cost reduction are highly important. Currently, gas turbine auxiliary power units (APU) are being used to start the thrust engines, and to power the air conditioning and environmental control systems while the aircraft is on the ground. U.S. Pat. No. 4,684,081 issued to Cronin discloses a system which integrates the auxiliary power unit (APU), emergency power unit (EPU), environmental control system (ECS), and engine start system (ESS) in order to reduce the number of parts, weight, and size of the aircraft. The auxiliary power unit is commonly considered to be a low-utilization device that adds weight and complexity to the airplane while providing little operational benefit during most flight conditions. However, the elimination of the APU would require that a substantial pneumatic ground cart and electric ground power cart accompany the aircraft until the main thrust engines are started.

3. Disclosure of Invention

The system of the present invention provides an integrated air conditioning/emergency power system (IAC/EPS) which utilizes electric motor driven vapor cycle refrigeration machinery in combination with an air turbine and compressor to produce an air conditioning/environmental control module which will also serve as a source for emergency electrical power.

The system provides an integrated air conditioning and power unit for use with an aircraft including an air turbine having air passages connected to one of an air inlet and a compressor of a gas turbine engine of the aircraft. A motor/generator is provided drivingly attached to the air turbine and connected to an electric power converter which is connected to a primary power system. The motor/generator is capable of drawing electricity from the primary power system and of generating electricity which is delivered to the primary power system. An air compressor is drivingly connected to the motor/generator. The air compressor includes an air passage connected to one of the air inlet and the compressor of the engine. A cooling system is provided which includes a system compressor drivingly connected to the motor/generator. A first evaporator is connected to the system compressor by a fluid passage, and a condenser is connected between the system compressor and the first evaporator by fluid passages. The air compressor includes an air outlet for providing pressurized air which is cooled by the first evaporator of the cooling system.

The cooling system further includes a second evaporator fluidly connected to the system compressor and a recirculation fan for drawing air from inside the aircraft cabin through the second evaporator.

The integrated air conditioning/emergency power system according to the present invention provides mechanical and electrical equipment in such way that the same equipment or major parts of it can be used to perform a multiplicity of functions. In this manner, a minimum of equipment is installed on the aircraft to perform all the required functions and to provide the required redundancy and reliability.

The integrated air conditioning/emergency power system according to the present invention, in some modes, will take advantage of the pressure energy in the ram compressed air before it goes through the engine compressor. The ram air utilized is at a lower temperature than the compressor air and therefore requires less processing than compressor bleed air.

In some cases, the ram compressed inlet air will have sufficient pressure to drive the vapor cycle unit, or to operate the unit in the emergency electrical power mode.

Some operational modes for the present invention will jointly use ram compressed air with engine compressed bleed air to drive the cabin pressurization and cooling equipment, with no requirement for electrical power input from the aircraft electrical power system.

In an emergency mode, the integrated air conditioning/emergency power system unit will perform as an electrical power generator. This precludes the need to install alternate emergency electrical generating equipment (e.g. ram air turbines/generators). The unit, operating in this mode, may be powered by bleed air from any functioning engine on the aircraft.

During supersonic flight, at which time the ram air is hot, the integrated air conditioning/emergency power system unit will provide cooling and cabin pressurization using bleed air or a combination of electric power and bleed air. The integrated air conditioning/emergency power system can also be used under these conditions to extract pressure and/or thermal energy from the hot bleed air, which can then be either used directly in the cabin or passed through the vapor cycle evaporator for further cooling.

During engine bleed extraction for anti-ice purposes, the proposed arrangement will extract heat and pressure from the bleed air and convert it into usable shaft energy for air conditioning or to produce electrical power. This would reduce the pressure and temperature of the bleed air to parameters usable for anti-ice and may replace the function of, and in some cases, preclude the need for the air pre-cooler and the pressure regulator which is presently used on conventional installations.

The integrated air conditioning/emergency power system arrangement provides a compact means of conveying the heat from the cabin recirculation air to the fuel mass. In this mode, the unit would be driven either by bleed air, the electric motor, or a combination of the two.

With the system of the present invention, any aircraft not having an auxiliary power unit could be operated using only one type of ground support cart and it could be either a pneumatic cart or electrical power cart. Use of either cart would allow engine starting or air conditioning while on the ground.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF DRAWINGS

The present invention will become more fully understood from the detailed description and the accompanying drawings, wherein:

FIG. 2 is a schematic representation of a control system for the integrated air conditioning and emergency power system according to the principles of the present invention.

DETAILED DESCRIPTION OF THE INVENTION

Figure 1:
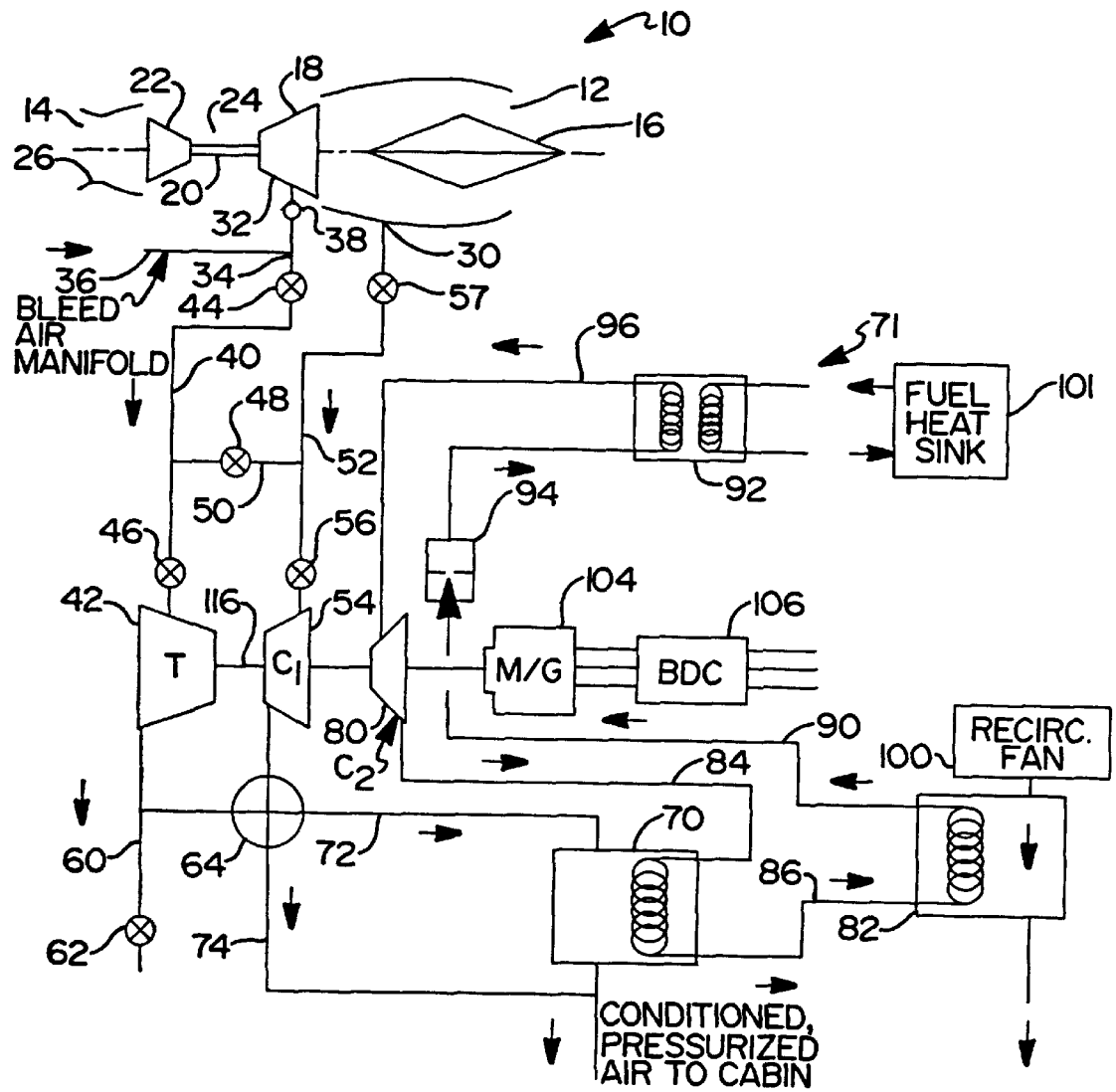
FIG. 1 is a schematic representation of the integrated air conditioning and emergency power system of the present invention.

With reference to FIGS. 1 and 2, the integrated air conditioning and emergency power system according to the present invention will be described. The system of the present invention is utilized in combination with an aircraft engine 10. The engine 10 includes an inlet end 12 and a nozzle end 14. The inlet end 12 is provided with an inlet diffuser 16 which reduces supersonic air to subsonic air for delivery to a compressor 18. The compressor 18 is driven by a shaft 20 which is connected to a turbine 22. A combustion section 24 is disposed between the compressor 18 and the turbine 22. Compressed air from the compressor 18 is delivered to the combustion section 24 where the compressed air is mixed with fuel and ignited. The combustion gases from the combustion section 24 are then delivered to the turbine 22 for driving the turbine blades which thereby turn shaft 20. The exhaust gases from the turbine 22 are then delivered through a supersonic expansion nozzle 26 disposed in the nozzle end 14 of the engine 10.

The system of the present invention utilizes a ram air port 30 in communication with the inlet end 12 of the engine 10. In addition, a bleed air port 32 is provided in communication with the compressor 18. The bleed air port 32 communicates via a passage 34 with a bleed air manifold 36 which is in fluid communication with bleed air from the other engines. A check valve 38 is disposed in the passage 34 for preventing high pressure bleed air from the bleed air manifold 36 from reversing flow in the passage 34.

A passage 40 is provided between the bleed air manifold 36 and an air turbine 42. A first valve 44 is provided in the passage 40 for delivering bleed air from the bleed air manifold 36 to the passage 40. A second valve 46 is provided for connecting the passage 40 with the air turbine 42. A third valve 48 is provided in a passage 50 which is connected between the fluid passage 40 and a passage 52 which communicates with an air compressor 54. A fourth valve 56 is disposed in the passage 52 for connecting the passage 52 with the ram air port 30. A fifth valve 57 is provided for connecting the passage 52 with the air compressor 54.

Exhaust air from the air turbine 42 escapes through a passage 60 which communicates with a sixth valve 62 which selectively provides heated air for anti-ice systems or exhausts the air overboard. The passage 60 also communicates with a mixing valve 64 which mixes the air turbine exhaust air with exhaust air from the air compressor 54. The air mixed by the mixing valve 64 is selectively directed to a vapor cycle evaporator 70 of an environmental control system 71 via a passage 72 which is then remixed with air from a passage 74 for providing conditioned, pressurized air to the aircraft cabin via a passage 76.

The vapor cycle environmental control system 71 includes a vapor-cycle compressor 80 drivingly connected to the air turbine 42. The vapor-cycle compressor 80 delivers pressurized refrigerant to the vapor cycle evaporator 70 and to a cabin evaporator 82 via refrigerant passages 84, 86. A refrigerant passage 90 is connected between the cabin evaporator 82 and the condenser 92. An expansion valve 94 is disposed in the refrigerant passage 90. A refrigerant passage 96 is disposed between the condenser 92 and the vapor-cycle compressor 80.

As discussed previously, the vapor cycle evaporator 70 is provided for cooling bleed air and ram air which is exhausted from the air turbine 42 and the air compressor 54 so that the high pressure air can be utilized for pressurizing the air craft cabin. A recirculation fan 100 is provided for recirculating air from inside the aircraft cabin through the cabin evaporator 82 in order to re-cool the cabin air. The condenser 92 removes heat from the refrigerant utilized in the environmental control system 71 and conveys the heat to a fuel heat sink 101.

A motor/generator 104 is drivingly connected to the air turbine 42 as well as the air compressor 54 and the vapor-cycle compressor 80. The motor/generator 104 is capable of drawing electricity from a primary power system 108 and of generating electricity which is delivered to the primary power system 108. A bidirectional electric power converter 106 is connected between motor/generator 104 and the primary power system 108. Motor/generator 104 is capable of driving the air compressor 54 and the vapor-cycle compressor 80 in a motor-operating mode and is also capable of generating electricity when driven by the air turbine 42. Electricity which is generated by the motor/generator 104 is delivered to the primary power system 108 and is either stored or delivered to other aircraft systems.

With reference to FIG. 2, the integrated air conditioning and environmental control system of the present invention is provided with an environmental system controller 110 which receives data from an air data computer 112. An electrical power source load management computer 114 is provided for monitoring where power is delivered from the aircraft primary power system 108.

The environmental system controller 110 controls the operation of each of the valves V1–V6 as well as the recirculation fan 100 based upon data received from the air data computer 112. The air data computer 112 monitors the temperature, humidity, and pressure of the cabin air.

With reference to FIGS. 1 and 2, the operational modes of the present invention will now be described.

MODE 1—NORMAL AIR CONDITIONING DURING CRUISE

Shaft power extraction from the engine is usually much more efficient than bleed air extraction and, during cruise, excess electrical energy is available from the aircraft primary electrical power system 108. Therefore, in this mode, the motor/generator 104 is driven from the aircraft primary electrical power system 108 through the bidirectional electrical power converter 106 which allows any frequency electrical power to drive the motor/generator 104 at any selected or programmed speed or torque up to the rated capacity of the converter 106 or the motor/generator 104. The motor/generator 104 then powers the air compressor 54. The air compressor 54 takes ram air from the ram air port 30 through open valves 56, 57 and compresses it to the required cabin/pressurization level. At supersonic cruise conditions, little pressurization is required. The air exiting the compressor 54 is then divided as required by the mixing valve 64 and passed through the vapor cycle evaporator 70 for cooling to the correct cabin temperature.

The vapor cycle compressor 80 is also powered by the motor/generator 104. In the event that electrical power is not available, due to failure or other demands, the shaft may be driven entirely or partially in any combination with the motor/generator 104 and through the use of main engine compressor bleed air extraction via bleed air port 32 operating on the air turbine 42. Exhaust from the turbine 42 may be discharged overboard via valve 62 or used to augment the cabin pressurization process via mixing valve 64.

MODE 2—NORMAL AIR CONDITIONING DURING CRUISE (bleed air only)

During some flight modes, demands for the electric power resources may reach a level at which it is expedient to operate the environmental control system under engine bleed power only. In this mode, bleed air will be extracted from the bleed air ports 38 of engine compressor 18 through open valve 44. The bleed air manifold 36 shown in FIG. 1 allows any operating engine to supply bleed air to any integrated air conditioning/environmental control system unit. The bleed air will pass through open valve 46 and power the turbine 42. The exhaust from the turbine 42 then passes through the mixer valve 64 to be combined with the other processed air either upstream or downstream of the vapor cycle evaporator 70. The shaft 116 of the integrated air conditioning/environmental control system is thus driven entirely by means of engine bleed air in this mode. Air from the ram air port 30 is directed through open valves 56 and 57 and compressed by the air compressor 54. This compressed air is then used in the normal manner through mixing and cooling in the vapor cycle evaporator 70 to cool and pressurize the aircraft cabin. In all of the cooling modes, the cabin evaporator 82 is used to cool the recirculated cabin air.

Furthermore, in this mode of operation, available electrical power may be used to drive the motor/generator 104 in the motor mode to supplement the engine bleed air to power the integrated air conditioning/environment control system unit, or conversely, excess bleed air power may be extracted and used to drive the motor/generator 104 as a generator to augment the electrical power for use elsewhere in the aircraft operation.

MODE 3—EMERGENCY ELECTRICAL POWER OPERATION/ENGINE OUT

During flight, an engine 10 may be shut down, depriving the electrical power system of the generating capacity mounted on the inoperative engine. Also, any of the engine driven electrical power generators may fail. During emergencies which result in a shortage of electrical power, bleed air from any engine may be directed from the bleed air port 32 to any of the integrated air conditioning/environmental control system modules to drive the air turbine 42 and thus the motor/generator 104 as a generator to provide emergency electrical power. This can be done concurrently with operation of the vapor cycle cooling function as long as sufficient bleed air power is available.

MODE 4—BLEED AIR MODULATION DURING ANTI-ICE FUNCTION

Ice protection will be required for supersonic transport operations during some flight regimes. The anti-ice provisions may be strictly based on a conventional bleed air system concept, or bleed air in conjunction with electrical thermal heaters. In any event, the bleed air is usually too high in temperature and pressure for immediate use for anti-ice purposes and is normally pre-processed through a pre-cooler to reduce the temperature, and through a pressure regulator to reduce the pressure. Both of these components accomplish their function by wasting or discarding valuable thermal energy. With the integrated air conditioning/ environment control system according to the present invention, energy is removed from the bleed air as it is first passed through the air turbine 42 prior to being utilized in the anti-ice function. This energy can be used to drive the motor/generator 104 as a generator and then utilized as electrical power to supplement the anti-ice function and the electrical heaters. Alternately, the shaft energy may be used to drive the vapor cycle compressor 80, or may be used as electricity for any other task. The result is that the cost and weight of the pre-cooler and pressure regulator valve is avoided in the design, and energy is not wasted.

MODE 5—RAM AIR ONLY OPERATION

Under some operational conditions, the inlet pressure from ram air port 30 will be sufficient to drive the integrated air conditioning/environment control system without the need for compressor bleed air. The compressed ram air is directed through ram air port 30, through open valves 57, 48, and 46 to power the air turbine 42. The valve 56 would be closed. The power thus generated could be used to power the vapor cycle air compressor, the motor/generator 104 or both. This provides a particular advantage in the case of a failed engine, or malfunctioning inlet center body in which case the spillage of air from the inlet 12 could be minimized and drag could be reduced by this alternate use of the inlet air.

In the system of the present invention, the electrical power source load management computer 114 and environmental system controller 110 operate in conjunction with one another for determining which operating mode should be employed based upon aircraft electrical power usage requirements as well as environmental control system requirements. Environmental system controller 110 is operable to open and close valves V1–V6 as well as selectively operating recirculation fan 100 based upon data received from air data computer 112.

The integrated air conditioning/environment control system of the present invention may be used or applied in any situation in which a multiplicity of types of energy conversion is desired to be accomplished at a single location. Power flow may be from the unit to the primary power system, or from the primary power system to the unit. In addition, the common shaft-mounted equipment is not limited to those previously described, but may include such components as pumps for water or hydraulic systems, or liquid phase turbines.

It is anticipated that a combuster unit could be integrated into the design of the present invention so that the proposed unit would resemble a gas turbine auxiliary power unit (APU) similar to those in use on present transport aircraft, but with the addition of the electric motor function and the vapor cycle compressor. Such a system would differ from the present APU also in the ability of the present invention to provide compressed air when motored by the electric motor, and to be driven alternately by bleed air acting on the power turbine.

It is anticipated that the system of the present invention may have other applications including stationary operation in refinery or processing plants, portable operation as an aircraft support ground power unit, other mobile applications such as on ocean ships, military armored vehicles, and heavy trucks or buses. In the fixed location application, such as in a petroleum refinery or oil production platform, the unit could be used to expand and condense natural gas products, while producing electrical power simultaneously. This usage would be similar to the use of the turbo-expanded device presently used for this purpose, but with the addition of the electric power generator and possibly a vapor cycle unit to reduce the number of passes required for the unit to condense the gas to a liquid for easy transport. In the same application, a pump could be added to re-inject the separated water into the ground.

Present day fighter aircraft require at least three different types (and often four) of ground support carts to service the aircraft while they are on the ground. These include pneumatic, air conditioning, hydraulic, and electrical. This presents a great logistic challenge when the aircraft are deployed away from the base. With the use of the integrated air conditioning/environment control system concept, it is conceivable that the number of carts could be reduced to one type. A single integrated air conditioning/emergency power system unit could supply the chilled air for the environment control system function as well as the compressed air for pneumatics requirements, and with the addition of a hydraulic pump to the integrated air conditioning/emergency power system unit, it could also provide the hydraulic pressure required for an aircraft hydraulic system ground functional readiness check.

The system of the present invention could have several shipboard applications. In one scheme, the unit could be used to provide local compressed air and/or air conditioning while being powered from the distributed electrical power system. This system would obviate the need to provide costly duplicate distribution systems for the pneumatic and air conditioning systems in addition to the electrical power systems.

Conversely, survivability in battle could be enhanced in the case where ship-wide distribution of two or three types of power have been installed. In this case, interruption of the electric power (due to battle damage) to a portion of the ship could be corrected by using the integrated air conditioning/emergency power system unit, powered by the distributed compressed air system, to provide local electrical service.

The system of the present invention permits a single line replaceable unit to process air from the engine inlet diffuser or any other ram/air capture device of a supersonic aircraft and use this processed air to pressurize and cool the cabin and avionic equipment. The present invention also uses engine bleed air in combination with the inlet air to cool and pressurize the cabin. Furthermore, engine bleed air from any operating engine is utilized to provide emergency electric power. The system of the present invention can use electrical power only or electrical power in combination with engine bleed air to cool and pressurize the cabin. This system also provides a means to cool recirculated air in the cabin, either using electrical power or a combination of electrical power and bleed air. This system also uses cool engine bleed air to reduce the pressure of the bleed air for utilities (i.e., anti-ice) while simultaneously generating electrical power, instead of wasting the heat and pressure energy in a heat exchanger.

The integrated air conditioning/emergency power system according to the present invention improves the operation of the supersonic transport on the ground. The system of the present invention facilitates the elimination of the gas turbine auxiliary power unit presently used on subsonic transports. The addition of a combuster to the integrated air conditioning/emergency power system unit would return the APU function to the aircraft, in that the integrated air conditioning/emergency power system would be a battery-started engine providing air conditioning during ground operations and electrical power to start the main engines. This would be achieved at a fraction of the cost and weight of a separate APU.

Even without the combuster, the integrated air conditioning/emergency power system of the present invention would enhance ground operations. For example, for an aircraft which is provided with an electric starter to start the main engines, the integrated air conditioning/emergency power system unit, can be utilized with pneumatic ground power which could be connected to drive the turbine to cause the motor/generator 104 to operate in the generator mode and provide electric power to start the engine. In addition, except during a brief interval during high power consumption during engine starting, the integrated air conditioning/emergency power system unit could provide the cabin cooling resource while being powered either electrically or pneumatically. In short, the integrated air conditioning/emergency power system unit will allow any aircraft that is equipped with it to operate on the ground using only one type of ground support cart.

Although the invention has been described with particular reference to certain embodiments thereof, variations and modifications can be effected within the spirit and scope of the following claims.

What is claimed is:

1. An integrated air conditioning and power unit for use with an engine of an aircraft, comprising:

an air turbine having an inlet air passage connected to the engine;

a motor/generator drivingly attached to said air turbine;

a primary power system capable of supplying electricity to said motor/generator for operation in a motor mode and capable of receiving electricity which is generated by said motor/generator in a generator mode;

an air compressor drivingly attached to said air turbine and said motor/generator;

a ram air duct for receiving ambient air under pressure;

a cooling system including a system compressor drivingly attached to said motor/generator, a first evaporator in fluid communication with said system compressor to enable cooling air exiting at least one of said air compressor and said air turbine, and a condenser in fluid communication with said system compressor and said first evaporator;

ducting for communicating said ambient air under pressure to said air turbine and said air compressor; and a valve system for controlling the application of said ambient air selectively to said air turbine and said air compressor depending on operational conditions affecting said aircraft.

2. The integrated air conditioning and power unit according to claim 1, wherein said cooling system further includes a second evaporator fluidly connected to said system compressor and a recirculation fan for drawing air from inside an enclosed space through said second evaporator.

3. The integrated air conditioning and power unit according to claim 1, wherein said condenser of said cooling system transfers heat to a heat sink.

4. The integrated air conditioning and power unit according to claim 1, wherein said air turbine is provided with an exhaust outlet which provides heated air for an aircraft anti-ice mechanism.

5. The integrated air conditioning and power unit according to claim 1, further comprising a mixing valve connected to receive air from an outlet of said air compressor and an outlet of said air turbine, said mixing valve being adjustable to alter an amount of air to be cooled by said first evaporator of said cooling system.

6. The integrated air conditioning and power unit according to claim 1, wherein said inlet air passage provides compressor bleed air from a compressor associated with said aircraft engine to said air turbine.

7. An integrated air conditioning and power unit for use with an aircraft engine including an air inlet and a compressor, comprising:

an air turbine in fluid communication with one of the air inlet and the compressor of the engine;

an air compressor drivingly attached to said air turbine, said air compressor being in fluid communication with one of the air inlet and the compressor of the engine;

a ram air duct for receiving pressurized ambient air;

a motor/generator drivingly attached to said air compressor:

a primary power system capable of supplying electricity to said motor/generator for operation in a motor mode and capable of receiving electricity which is generated by said motor/generator in a generator mode;

a cooling system including a system compressor drivingly attached to said motor/generator, a first evaporator in fluid communication with said system compressor, and a condenser in fluid communication with said system compressor and said first evaporator by fluid passages;

ducting for providing pressurized ambient air to said air turbine and said air compressor;

a valve system for selectively directing said pressurized ambient air as needed to said air turbine and said air compressor; and wherein said air compressor includes an air outlet for providing pressurized air to said first evaporator of said cooling system.

8. The integrated air conditioning and power unit according to claim 7, wherein said cooling system further includes a second evaporator fluidly connected to said system compressor and a recirculation fan for drawing air from inside an enclosed space through said second evaporator.

9. The integrated air conditioning and power unit according to claim 7, wherein said condenser of said cooling system transfers heat to a heat sink.

10. The integrated air conditioning and power unit according to claim 7, wherein said air turbine is provided with an exhaust outlet which provides heated air for an aircraft anti-ice mechanism.

11. The integrated air conditioning and power unit according to claim 7, further comprising a mixing valve connected to receive air from said air outlet of said air compressor and an outlet of said air turbine, said mixing valve being adjustable to alter an amount of air to be cooled by said first evaporator of said cooling system.

12. The integrated air conditioning and power unit according to claim 7, wherein said air turbine is selectively provided with compressor bleed air from the compressor of the engine.

13. A power unit for an aircraft having an engine, comprising:

an air turbine having an air passage connected to a bleed air port of said engine;

a motor/generator drivingly attached to said air turbine;

a primary power system capable of supplying electricity to said motor/generator for operation in a motor mode and capable of receiving electricity which is generated by said motor/generator in a generator mode;

an air compressor drivingly attached to said motor/generator and said air turbine;

a cooling system including a system compressor drivingly attached to said motor/generator, a first evaporator in fluid communication with said system compressor, and a condenser in fluid communication with said system compressor and said first evaporator;

wherein said air compressor includes an air outlet for providing pressurized air which is capable of being cooled by said first evaporator of said cooling system;

a ram air duct for receiving pressurized ambient air and supplying said air to said air compressor and said air turbine as needed; and a first valve for applying said pressurized ambient air selectively to said air turbine to supplement said bleed air received from said engine, to thereby assist in driving said air turbine, and a second valve for permitting said pressurized ambient air to assist in driving said air compressor.

14. The power unit according to claim 13, wherein said condenser of said cooling system transfers heat to a heat sink.

* * * * *